(12) United States Patent
Cox

(10) Patent No.: US 8,328,486 B2
(45) Date of Patent: Dec. 11, 2012

(54) WHEEL RETENTION NUT

(75) Inventor: Devon Cox, High Prairie (CA)

(73) Assignee: 1052633 Alberta Ltd., Stony Plain, Alberta (CA)

( * ) Notice: Subject to any disclaimer, the term of this patent is extended or adjusted under 35 U.S.C. 154(b) by 14 days.

(21) Appl. No.: 11/156,809

(22) Filed: Jun. 20, 2005

(65) Prior Publication Data

US 2006/0008340 A1    Jan. 12, 2006

(51) Int. Cl.
*F16B 39/284* (2006.01)
(52) U.S. Cl. ........ 411/248; 411/246; 411/432; 411/295; 411/316; 301/35.625
(58) Field of Classification Search .......... 411/221, 411/246, 248, 432, 295, 304, 315, 316, 427; 301/35.55, 35.58, 35.625
See application file for complete search history.

(56) References Cited

U.S. PATENT DOCUMENTS

| | | | | |
|---|---|---|---|---|
| 299,969 | A * | 6/1884 | Fahy | 301/114 |
| 578,276 | A * | 3/1897 | Strauss et al. | 411/221 |
| 692,572 | A * | 2/1902 | Wilcox | 411/248 |
| 1,256,882 | A * | 2/1918 | Dickinson, Jr. | 301/9.1 |
| 1,352,643 | A * | 9/1920 | Young | 411/248 |
| 1,440,938 | A * | 1/1923 | Sieroslawski | 411/221 |
| 1,491,163 | A * | 4/1924 | Osenkowski | 411/221 |
| 1,755,807 | A * | 4/1930 | Boles | 411/221 |
| 3,762,455 | A * | 10/1973 | Anderson, Jr. | 411/190 |
| 3,844,323 | A * | 10/1974 | Anderson, Jr. | 411/190 |
| 4,019,824 | A | 4/1977 | Percy | |
| 4,534,101 | A * | 8/1985 | Rosan, Jr. | 29/432 |
| 4,752,178 | A | 6/1988 | Greenhill | |
| 4,812,094 | A * | 3/1989 | Grube | 411/134 |
| 5,026,122 | A * | 6/1991 | Grubisic et al. | 301/35.625 |
| 5,085,548 | A * | 2/1992 | Moyles | 411/316 |
| 5,251,995 | A * | 10/1993 | Chi | 403/320 |
| 5,442,133 | A * | 8/1995 | Arnold et al. | 174/51 |
| 5,573,311 | A * | 11/1996 | Clohessy | 301/105.1 |
| 5,967,721 | A * | 10/1999 | Giachinta et al. | 411/7 |
| 6,290,442 | B1 * | 9/2001 | Peterkort | 411/140 |
| 7,029,218 | B2 * | 4/2006 | Peterkort | 411/198 |
| 7,056,161 | B2 * | 6/2006 | Delcourt et al. | 439/766 |

* cited by examiner

*Primary Examiner* — Victor Batson
*Assistant Examiner* — Tyler Johnson
(74) *Attorney, Agent, or Firm* — Greenblum & Bernstein, P.L.C.

(57) ABSTRACT

A wheel retention nut includes a body having a front face and a rear face. A central bore with internal threads extends through the body. A first outer perimeter of a first diameter is positioned adjacent to the front face. The first outer perimeter defines a polygon adapted to receive a wrench. A second outer perimeter of a second diameter, which is larger than the first diameter, is positioned adjacent to the rear face. The second outer perimeter is sized to retain an eccentrically rotating wheel.

19 Claims, 2 Drawing Sheets

… (US 8,328,486 B2)

WHEEL RETENTION NUT

This application claims priority from Canadian Application Serial No. 2,474,994 filed Jul. 7, 2004.

FIELD OF THE INVENTION

The present invention relates to a nut, which is used to retain a wheel on an axle.

BACKGROUND OF THE INVENTION

U.S. Pat. No. 4,019,824 (Percy from 1977) discloses a wheel retention nut, versions of which are in wide use throughout North America. The Percy wheel retention nut addresses the loosening of a wheel nut by vibration, which is one of the major problems leading to wheel loss.

Another problem leading to wheel loss is bearing failure. Bearings facilitate concentric rotation of the wheel. When bearings fail, they seize up and resist rotation. If this occurs when the vehicle is in motion, something has to give. The rotation of the wheel under heavy load acting against the seized bearing, causes the bearing to disintegrate. Once the bearing disintegrates, eccentric motion of the wheel occurs. A wheel rotation nut intended to maintain a concentrically rotating wheel in position, is unable to maintain the wheel in position once eccentric rotation occurs. The wheel is able to jump the wheel nut, during the course of its eccentric rotation.

SUMMARY OF THE INVENTION

What is required is a wheel retention nut which is able to retain an eccentrically rotating wheel.

According to the present invention there is provided a wheel retention nut, which includes a body having a front face and a rear face. A central bore with internal threads extends through the body. A first outer perimeter of a first diameter is positioned adjacent to the front face. The first outer perimeter defines a polygon adapted to receive a wrench. A second outer perimeter of a second diameter, which is larger than the first diameter, is positioned adjacent to the rear face. The second outer perimeter is sized to retain an eccentrically rotating wheel.

BRIEF DESCRIPTION OF THE DRAWINGS

These and other features of the invention will become more apparent from the following description in which reference is made to the appended drawings, the drawings are for the purpose of illustration only and are not intended to in any way limit the scope of the invention to the particular embodiment or embodiments shown, wherein.

DETAILED DESCRIPTION OF THE PREFERRED EMBODIMENT

Figure 1:
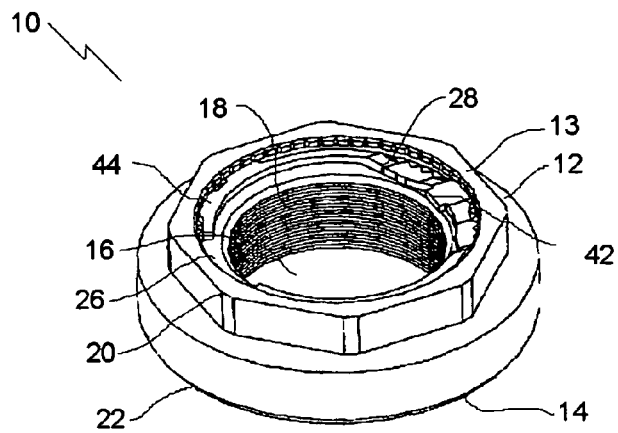
FIG. 1 is a perspective view of a wheel retention nut constructed in accordance with the teachings of the present invention.

The preferred embodiment, a wheel retention nut generally identified by reference numeral 10, will now be described with reference to FIGS. 1 through 6.

Figure 2:
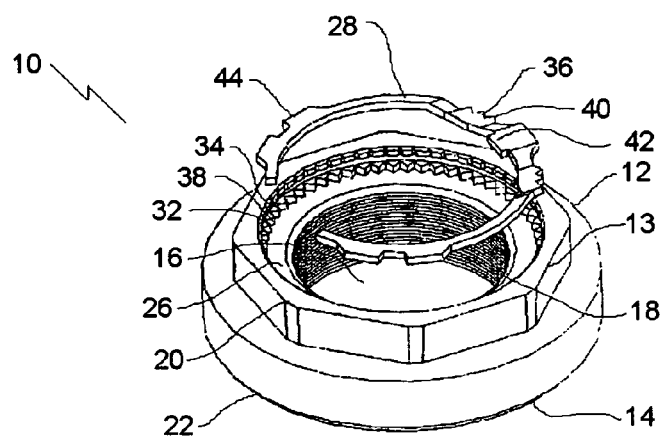
FIG. 2 is a perspective view of the wheel retention nut illustrated in FIG. 1, with the split retaining ring removed.
Figure 3:
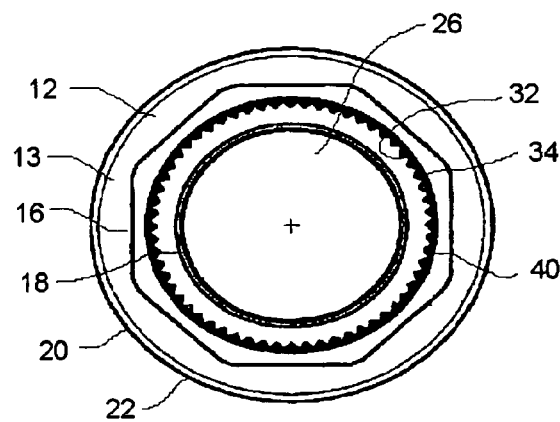
FIG. 3 is a top plan view of the wheel retention nut illustrated in FIG. 1.
Figure 4:
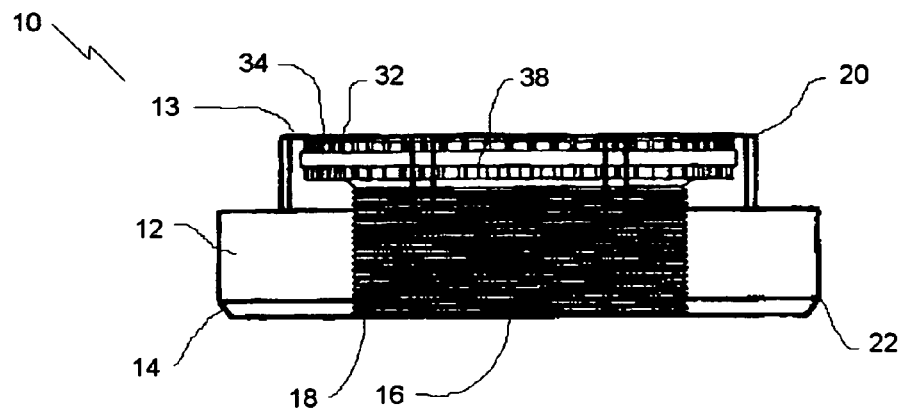
FIG. 4 is a side elevation view, in section, of the wheel retention nut illustrated in FIG. 1.
Figure 5:
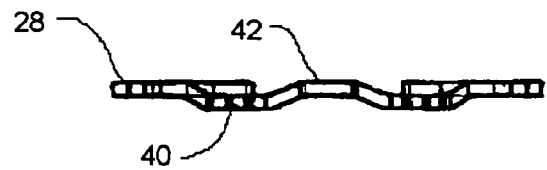
FIG. 5 is a side elevation view of the split retaining ring.
Figure 6:
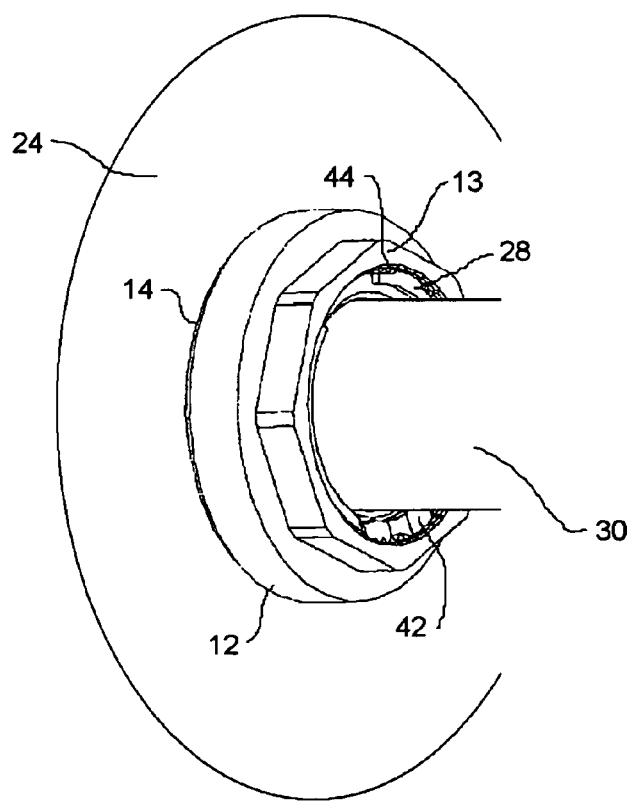
FIG. 6 is a perspective view of the wheel retention nut illustrated in FIG. 1 installed on a shaft.

Structure and Relationship of Parts:

Referring now to FIG. 1, there is shown wheel retention nut 10. Wheel retention nut 10 includes a body 12 having a front face 13 and a rear face 14. There is a central bore 16 with internal threads 18 extending through body 10. A first outer perimeter 20 of a first diameter that is adjacent to front face 13, where first outer perimeter 20 defines a polygon adapted to receive a wrench. A second outer perimeter 22 of a second diameter that is larger than the first diameter, adjacent to rear face 14, where second outer perimeter 22 is sized to retain an eccentrically rotating wheel 24. Referring to FIG. 2, body 12 has a cavity 26 in front face 13 which is adapted to receive a split retaining ring 28. Split retaining ring 28 is adapted to engage a shaft 30 to retain body 12 on shaft 30. Cavity 26 receives split retaining ring 28 by using a first engagement means 34 on an internal surface 32 of cavity 26 and second engagement means 36 on split retaining ring 28. First engagement means 34 and second engagement means 36 engage in such a way to maintain body 12 in a selected rotational position on shaft 30. As illustrated in FIG. 3, first engagement means 34 consists of teeth 38 all around internal surface 32 of cavity 26. Referring to FIG. 5, split retaining ring 28 has a portion that is lower than the rest of ring 28, and teeth 40 are located along this portion to correspond to teeth 38 of cavity 26. The upper portion of ring 28 has tabs 44 which apply pressure to internal surface 32 of cavity 26 when installed on shaft 30. Referring to FIG. 2, split retaining ring 28 also has a protrusion 42 which is designed to correspond to an indentation in the shaft 30 such that retaining ring 28 engages shaft 30 by protrusion 42, and engages body 12 by teeth 38 and tabs 44.

The wheel retention nut 10 of the present invention is used to affix a wheel rim 24 to a threaded shaft 30. The wheel retention nut 10 includes a solid body 12 having a front polygonal portion 20 and an opposed rear disk portion 22. The front polygonal portion 20 is integral with the rear disk portion 22. The rear disk portion 22 has a thickness that is thicker than a thickness of the front polygonal portion 20 along an axial length of the solid body 12 and the rear disk portion is configured to retain the wheel rim 24. The rear disk portion 22 may be substantially cylindrical in shape.

The central bore 16 extends through the solid body 12 from the front face 13 of the front polygonal portion 20 to the rear face 14 of the rear disk portion 22. The central bore 16 has internal threads 18 that extend from the rear face 14 of the rear disk portion 22 and extend only partially through the front polygonal portion 20. The wheel retention nut also includes an internal locking mechanism 28 that may take the form of a split retaining ring located in the cavity 26, as shown in FIG. 1.

The front polygonal portion 20 spans a first portion of the axial length of the solid body 12, adjacent the front face 13, and has a polygon exterior transverse shape that facilitates tightening and loosening of the wheel retention nut with respect to the threaded shaft 30. The polygon exterior transverse shape has a smaller first transverse dimension measured between opposite edges of the front polygonal portion 20 and a larger second transverse dimension measure between opposite vertices of the front polygonal portion 20.

The rear disk portion 22 spans a second portion of the axial length of the solid body 12, adjacent the rear face 14, and the outer perimeter of the rear disk portion 22 is configured to engage and retain an inner circumferential surface of the wheel rim 24. The outer perimeter of the rear disk portion 22 has a diameter that is larger than both the first and second transverse dimensions of the front polygonal portion in order to prevent the wheel rim 24 from separating from the wheel retention nut 10 during a bearing failure.

The rear disk portion 22 has a continuous, circumferential uninterrupted wear surface which is devoid of any aperture therein and is continuous and uninterrupted at all radial points from the outer perimeter of the rear disk portion 22 to the front polygonal portion. A stepped transition is located between the front polygonal portion 20 and the rear disk portion 22.

Operation:

The use of wheel retention nut 10 will now be discussed with reference to FIGS. 1 through 4. To retain a wheel rotating on bearings, body 12 is threaded onto shaft 30 of wheel 24 up to wheel 24. Once body 12 is in the desired position, split retaining ring 28 is then inserted in cavity 26, such that protrusion 42 engages shaft 30, teeth 40 engage teeth 38 of cavity 26, and tabs engage internal surface 32 of cavity 26. Wheel retention nut 10 is then engaged such that split retaining ring 28 prevents body 12 from rotating, body 12 retains the wheel in position, and second face 14 retains wheel 24 if it begins rotating eccentrically.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

It will be apparent to one skilled in the art that modifications may be made to the illustrated embodiment without departing from the spirit and scope of the invention as hereinafter defined in the Claims.

What is claimed is:

1. A wheel retention nut for affixing a wheel rim to a threaded shaft, the wheel retention nut comprising:
   a solid body having a front polygonal portion and an opposed rear disk portion, the polygonal portion is integral with the rear disk portion, and the rear disk portion has a thickness that is thicker than a thickness of the front polygonal portion along an axial length of the solid body and is configured to retain the wheel rim;
   a central bore extending through the solid body from a front face of the front polygonal portion to a rear face of the rear disk portion and the central bore having an internal thread extending axially from the rear face of the rear disk portion and only partially through the polygonal portion; and
   an internal locking mechanism positioned within the central bore;
   the polygonal portion spans a first portion of the axial length of the solid body, adjacent the front face, and has a polygon transverse exterior shape which forms a wrench engaging outer perimeter which facilitates tightening and loosening of the wheel retention nut with respect to the threaded shaft, and the polygon transverse exterior shape having a smaller first transverse dimension and a larger second transverse dimension;
   the rear disk portion spans a second portion of the axial length of the solid body and includes an outer perimeter that is configured to engage and retain an inner circumferential surface of the wheel rim, the outer perimeter of the rear disk portion has a diameter larger than both the smaller first transverse dimension and the larger second transverse dimension of the polygon transverse exterior shape of the polygonal portion to prevent the wheel rim from separating from the wheel retention nut during a bearing failure, the rear disk portion having a continuous, circumferential uninterrupted wear surface which is devoid of any aperture therein and is continuous and uninterrupted at all radial points from the outer perimeter of the rear disk portion to the wrench engaging outer perimeter of the front polygonal portion, and a stepped transition is located between the front polygonal portion and the rear disk portion.

2. The wheel retention nut according to claim 1, wherein the front polygonal portion of the solid body has a cavity therein for accommodating a split retaining ring.

3. The wheel retention nut according to claim 1, in combination with a threaded shaft, wherein the front polygonal portion of the solid body has a cavity therein and a split retaining ring is accommodated within the cavity, an internal surface of the cavity has first engagement means which mates with second engagement means carried by the split retaining ring for maintaining the solid body in a selected rotational position on the threaded shaft.

4. The wheel retention nut according to claim 3, wherein the first engagement means comprises teeth provided around the internal surface of the cavity and the split retaining ring has a portion, lower than a remainder of the split retaining ring, and mating teeth are located along this portion to correspond to the teeth of the cavity, and an upper portion of the split retaining ring has tabs which apply pressure to the internal surface of the cavity when installed on the threaded shaft.

5. The wheel retention nut according to claim 4, wherein the split retaining ring also has a protrusion which mates with an indentation in the threaded shaft such that the split retaining ring engages the threaded shaft by the protrusion, and engages the solid body by the mating teeth and the tabs.

6. A wheel retention nut for affixing a wheel rim to a threaded shaft, the wheel retention nut comprising:
   a solid body having a front face and an opposed rear face;
   a central bore extending through the solid body from the front face to the rear face and the central bore having an internal thread;
   a first portion of an axial length of the solid body, adjacent the front face, having a polygon transverse exterior shape which forms a wrench engaging outer perimeter which facilitates tightening and loosening of the wheel retention nut with respect to the threaded shaft, and the polygon transverse exterior shape having a smaller first transverse dimension and a larger second transverse dimension;
   a second portion of the axial length of the solid body being cylindrical, having a thickness that is thicker than a thickness of the first portion along the axial length of the solid body, and an outer perimeter that is configured to engage and retain an inner circumferential surface of the wheel rim, the outer perimeter of the second portion is substantially cylindrical and provides a continuous and uninterrupted circumferential wear surface and has a diameter which is larger than both the smaller first transverse dimension and the larger second transverse dimension of the polygon transverse exterior shape of the first portion of the wheel retention nut to prevent the wheel rim from separating from the wheel retention nut during a bearing failure, the second portion, adjacent the rear face, providing an uninterrupted wear surface which is continuous and uninterrupted and devoid of apertures at all radial points from the outer perimeter of the second portion to the wrench engaging outer perimeter of the first portion; and a stepped transition is located between the first portion and the second portion;

the front face of the solid body has a cavity therein and a split retaining ring is accommodated within the cavity, an internal surface of the cavity has first engagement means which mates with second engagement means carried by the split retaining ring for maintaining the solid body in a selected rotational position on the threaded shaft; and the split retaining ring is located between the first portion of the body and the central bore, the internal thread of the central bore extending the axial length of the second portion of the solid body and a portion of the axial length of the first portion of the solid body.

7. The wheel retention nut according to claim 6, wherein the first engagement means comprises teeth provided around the internal surface of the cavity and the split retaining ring has a portion, lower than a remainder of the split retaining ring, and mating teeth are located along this portion to correspond to the teeth of the cavity, and an upper portion of the split retaining ring has tabs which apply pressure to the internal surface of the cavity when installed on the threaded shaft.

8. The wheel retention nut according to claim 7, wherein the split retaining ring also has a protrusion which mates with an indentation in the threaded shaft such that the split retaining ring engages the threaded shaft by the protrusion, and engages the solid body by the mating teeth and the tabs.

9. The wheel retention nut as defined in claim 1, wherein the internal threads, of the central bore, extend completely through the rear disk portion but less than half way through the front polygonal portion.

10. The wheel retention nut as defined in claim 6, wherein the internal threads, of the central bore, extend completely through the second portion but less than half way through the first portion.

11. A wheel retention assembly for affixing a wheel rim to a threaded shaft, the wheel retention assembly comprising:
  a wheel rim; and
  a wheel retention nut including:
    a solid body having a front polygonal portion and an opposed rear disk portion, the polygonal portion is integral with the rear disk portion, and the rear disk portion has a thickness that is thicker than a thickness of the front polygonal portion along an axial length of the solid body and is configured to retain the wheel rim;
    a central bore extending through the solid body from a front face of the front polygonal portion to a rear face of the rear disk portion and the central bore having an internal thread extending axially from the rear face of the rear disk portion and only partially through the polygonal portion; and
    an internal locking mechanism positioned within the central bore;
    the polygonal portion spans a first portion of the axial length of the solid body, adjacent the front face, and has a polygon transverse exterior shape which forms a wrench engaging outer perimeter which facilitates tightening and loosening of the wheel retention nut with respect to the threaded shaft, and the polygon transverse exterior shape having a smaller first transverse dimension and a larger second transverse dimension;
    the rear disk portion spans a second portion of the axial length of the solid body and includes a wheel engaging and retaining outer perimeter that is configured to engage and retain an inner circumferential surface of the wheel rim, the wheel engaging and retaining outer perimeter has a diameter larger than both the smaller first transverse dimension and the larger second transverse dimension of the polygon transverse exterior shape of the polygonal portion to prevent the wheel rim from separating from the wheel retention nut during a bearing failure, the rear disk portion having a continuous, circumferential uninterrupted wear surface which is devoid of any aperture therein and is continuous and uninterrupted at all radial points from the wheel engaging and retaining outer perimeter to the wrench engaging outer perimeter; and a stepped transition is located between the front polygonal portion and the rear disk portion.

12. The wheel retention assembly according to claim 11, wherein the front polygonal portion of the solid body has a cavity therein for accommodating a split retaining ring.

13. The wheel retention assembly according to claim 11, wherein the front polygonal portion of the solid body has a cavity therein, and a split retaining ring and a threaded shaft are accommodated within the cavity, an internal surface of the cavity has first engagement means which mates with second engagement means carried by the split retaining ring for maintaining the solid body in a selected rotational position on the threaded shaft.

14. The wheel retention assembly according to claim 13, wherein the first engagement means comprises teeth provided around the internal surface of the cavity and the split retaining ring has a portion, lower than a remainder of the split retaining ring, and mating teeth are located along this portion to correspond to the teeth of the cavity, and an upper portion of the split retaining ring has tabs which apply pressure to the internal surface of the cavity when installed on the threaded shaft.

15. The wheel retention assembly according to claim 14, wherein the split retaining ring also has a protrusion which mates with an indentation in the shaft such that split retaining ring engages the threaded shaft by the protrusion, and engages the solid body by the mating teeth and the tabs.

16. The wheel retention assembly as defined in claim 11, wherein the internal threads, of the central bore, extend completely through the rear disk portion but less than half way through the front polygonal portion.

17. The wheel retention nut according to claim 1, wherein the rear disk portion is configured to retain an eccentrically rotating wheel.

18. The wheel retention nut according to claim 6, wherein the second portion is configured to retain an eccentrically rotating wheel.

19. The wheel retention assembly according to claim 11, wherein the rear disk portion is configured to retain an eccentrically rotating wheel.

* * * * *